(12) United States Patent
Lin et al.

(10) Patent No.: US 8,523,157 B2
(45) Date of Patent: Sep. 3, 2013

(54) INSPECTION DEVICE WITH ROTATABLE ADJUSTMENT MEMBERS

(75) Inventors: Po-Yu Lin, Taipei Hsien (TW); Chiu-Yi Wu, Taipei Hsien (TW); Chao-Chien Lee, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1078 days.

(21) Appl. No.: 12/506,409

(22) Filed: Jul. 21, 2009

(65) Prior Publication Data

US 2010/0148029 A1    Jun. 17, 2010

(30) Foreign Application Priority Data

Dec. 12, 2008    (CN) .......................... 2008 1 0306201

(51) Int. Cl.
| | |
|---|---|
| *B23Q 1/25* | (2006.01) |
| *B23Q 1/64* | (2006.01) |
| *B68G 7/00* | (2006.01) |
| *B23P 19/00* | (2006.01) |
| *H04N 5/225* | (2006.01) |
| *F16M 11/00* | (2006.01) |

(52) U.S. Cl.
USPC .................. 269/56; 269/55; 29/91.1; 29/740; 348/373

(58) Field of Classification Search
USPC .............. 269/56, 55; 29/91.1, 740, 840, 834; 348/373, 82, 135, 95, 207.99
See application file for complete search history.

(56) References Cited

U.S. PATENT DOCUMENTS

| | | | |
|---|---|---|---|
| 4,249,810 A * | 2/1981 | O'Connor et al. .............. 396/19 |
| 5,119,190 A * | 6/1992 | Lemelson ....................... 348/95 |
| 5,128,753 A * | 7/1992 | Lemelson ..................... 382/141 |
| 5,185,667 A * | 2/1993 | Zimmermann .......... 348/207.99 |
| 5,305,391 A * | 4/1994 | Gomibuchi .................... 382/142 |
| 5,331,174 A * | 7/1994 | Dassler et al. ............ 250/559.24 |
| 5,351,078 A * | 9/1994 | Lemelson ..................... 348/135 |
| 6,161,811 A * | 12/2000 | Suhara et al. .................. 248/638 |
| 6,168,009 B1 * | 1/2001 | Asai et al. .................. 198/468.4 |
| 6,294,747 B1 * | 9/2001 | Liu et al. ...................... 209/574 |
| 6,477,266 B1 * | 11/2002 | Asar ............................. 382/147 |
| 6,665,928 B2 * | 12/2003 | Suhara ............................ 29/834 |
| 6,674,531 B2 * | 1/2004 | Mahner ......................... 356/457 |
| 6,739,036 B2 * | 5/2004 | Koike et al. .................... 29/743 |
| 6,904,672 B2 * | 6/2005 | Nagafuku et al. .............. 29/840 |
| 6,922,237 B2 * | 7/2005 | Ross .......................... 356/241.5 |
| 6,931,716 B2 * | 8/2005 | Suhara et al. ................... 29/740 |
| 6,941,646 B2 * | 9/2005 | Suhara ............................ 29/740 |
| 7,017,896 B2 * | 3/2006 | Sa .................................. 269/55 |
| 7,075,662 B2 * | 7/2006 | Hallerman et al. ........... 356/604 |
| 7,085,693 B2 * | 8/2006 | Zimmerman ..................... 703/6 |
| 7,089,655 B2 * | 8/2006 | Isogai et al. .................... 29/740 |

(Continued)

Primary Examiner — Lee D Wilson
Assistant Examiner — Alvin Grant
(74) Attorney, Agent, or Firm — Altis Law Group, Inc.

(57) ABSTRACT

An inspection device includes a base to receive an electronic device, a supporting member, a first adjustment member, a second adjustment member, and an inspecting member installed on the second adjustment member. The supporting member includes a horizontal plate movable relative to the base, a guideway fixed on the horizontal plate, and a guiding block movably mounted on the guideway. The first adjustment member includes a fixing plate fixed on the guiding block, and an adjusting plate rotatably attached to the fixing plate, and movable and rotatable relative to the base. The second adjustment member is fixed on the adjusting plate. Movement and rotation of the adjusting plate relative to the base allow movement and rotation of the second adjustment member relative to the base to allow movement and rotation of the inspecting member relative to the electronic device.

13 Claims, 4 Drawing Sheets

(56) References Cited

U.S. PATENT DOCUMENTS

| | | | |
|---|---|---|---|
| 7,237,465 B2 * | 7/2007 | Huang | 83/452 |
| 7,417,444 B2 * | 8/2008 | Shinada et al. | 324/754.22 |
| 7,420,587 B2 * | 9/2008 | Davis | 348/82 |
| 7,420,687 B2 * | 9/2008 | Pfaff | 356/457 |
| 7,470,071 B2 * | 12/2008 | Ibaraki et al. | 396/348 |
| 7,524,119 B2 * | 4/2009 | Sandhu | 396/427 |
| 7,539,340 B2 * | 5/2009 | Kochi et al. | 382/154 |
| 7,564,534 B2 * | 7/2009 | Den Boef et al. | 355/53 |
| 7,570,300 B2 * | 8/2009 | Eichenberger | 348/373 |
| 7,646,193 B2 * | 1/2010 | Suzuki et al. | 324/756.01 |
| 7,661,181 B1 * | 2/2010 | Whitfield | 29/91.1 |
| 7,952,074 B2 * | 5/2011 | Shinada et al. | 250/311 |
| 8,086,338 B2 * | 12/2011 | Yano et al. | 700/108 |
| 8,137,050 B2 * | 3/2012 | Yamada et al. | 414/806 |

* cited by examiner

INSPECTION DEVICE WITH ROTATABLE ADJUSTMENT MEMBERS

BACKGROUND

1. Technical Field

The present disclosure generally relates to inspection devices, and more particularly to an inspection device with two rotatable adjustment members.

2. Description of Related Art

With developments in technology, many electronic devices such as mobile phones and personal digital assistants (PDA), for example, integrate multiple functions. The electronic devices undergo a variety of inspections to ensure quality. Frequently, the electronic device is mounted in an inspection device to inspect appearance thereof. The inspection device includes a base to receive the electronic device, a supporting frame, and a camera movably attached to the supporting frame and capturing images to assess the appearance of the electronic device. However, since the camera cannot rotate relative to the base, image capture angles are limited, resulting in incomplete inspection results.

Therefore, a need exists in the industry to overcome the described limitations.

DETAILED DESCRIPTION

Figure 1:
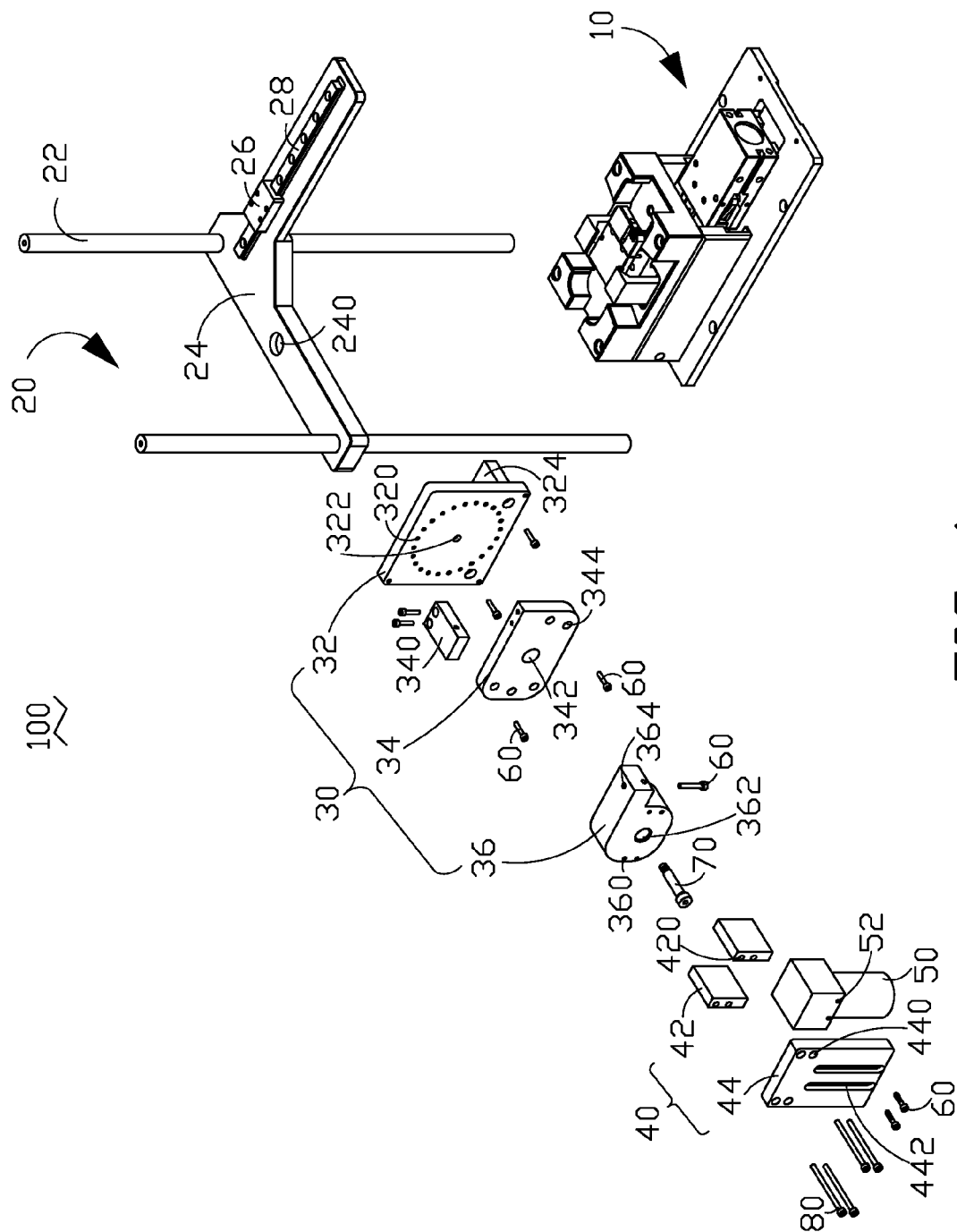
FIG. 1 is an exploded, isometric view of an inspection device of an exemplary embodiment of the disclosure.

Referring to FIG. 1, an inspection device 100 inspects the appearance of an electronic device 200 (see FIG. 4), such as a mobile phone or personal digital assistant (PDA). The inspection device 100 includes a base 10 to receive the electronic device 200, a supporting member 20, a first adjustment member 30, a second adjustment member 40, and an inspecting member 50. The inspecting member 50 may be a camera.

The supporting member 20 adjusts vertical and horizontal distances between the first adjustment member 30 and the base 10 to alter vertical and horizontal distances between the inspecting member 50 and the base 10. The supporting member 20 includes a locating portion 22, a horizontal plate 24 slidably mounted on the locating portion 22 and vertically movable relative to the base 10, a sliding block 26, and a guideway 28 fixed on the horizontal plate 24. The horizontal plate 24 includes a horizontal spirit level 240 to level the horizontal plate 24. The sliding block 26 is slidably mounted on the guideway 28.

In the illustrated embodiment, the locating portion 22 is a pair of poles. The pair of poles may be fixed on the base 10 or the floor.

The first adjustment member 30 is mounted on the sliding block 26, movable vertically and horizontally relative to the base 10. The first adjustment member 30 includes a fixing plate 32 installed on the sliding block 26, a first adjusting plate 34 rotatably attached to the fixing plate 32, and a second adjusting plate 36 rotatably attached to the first adjusting plate 34.

The second adjustment member 40 is fixed on the second adjusting plate 36, movable vertically and horizontally and rotatable relative to the base 10. The second adjustment member 40 includes a pair of fixing blocks 42 and an adjusting block 44. The pair of fixing blocks 42 and the adjusting block 44 are installed on the second adjusting plate 36.

The inspecting member 50 is slidably mounted on the adjusting block 44 of the second adjustment member 40, movable vertically and horizontally and rotatable relative to the base 10.

Figure 2:
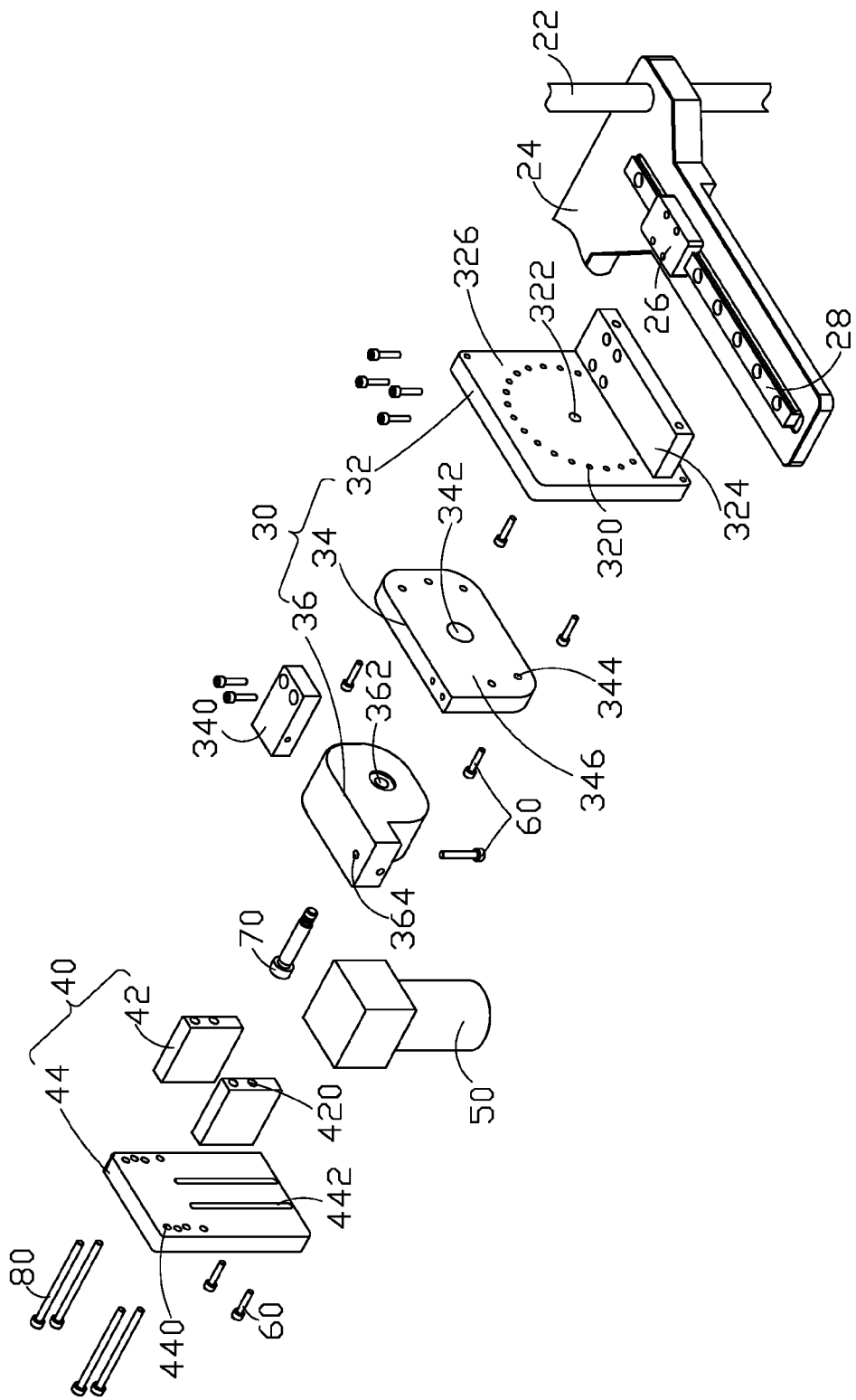
FIG. 2 is an exploded, isometric view of a supporting member, a first adjustment member, a second adjustment member, and an inspecting member of the inspection device of FIG. 1, viewed from another aspect.

Referring also to FIG. 2, the fixing plate 32 includes a main plate 326 and a mounting plate 324 perpendicular to the main plate 326. The main plate 326 defines a plurality of locating holes 320 arranged in a circular array and a mounting hole 322 located in a center of the circular array. The plurality of locating holes 320 are angled at about 15° from each other. The mounting plate 324 is fixed on the sliding block 26 so that the fixing plate 32 can slide along the guideway 28. In the illustrated embodiment, the plurality of locating holes 320 and the mounting hole 322 are threaded.

The first adjusting plate 34 includes a main body 346 and a locating block 340 fixed on a side of the main body 346. The main body 346 defines a first through hole 342 located in a center of the main body 346, and a plurality of fixing holes 344 corresponding to some of the plurality of locating holes 320. Two fasteners 60, such as bolts, extend through two corresponding fixing holes 344 and are fixed in two of the plurality of locating holes 320 to rotatably attach the first adjusting plate 34 to the fixing plate 32. A first rotatable angle of the first adjusting plate 34 relative to the fixing plate 32 is adjusted via the two fasteners 60 being fixed in different locating holes 320. Because the plurality of locating holes 320 are angled at about 15° from each other, the least first rotatable angle of the first adjusting plate 34 relative to the fixing plate 32 is about equal to 15°. That is, the first adjusting plate 34 roughly adjusts the rotatable angle of the inspecting member 50 relative to the base 10.

The second adjusting plate 36 defines a second through hole 362 located in a center of the second adjusting plate 36, a plurality of retaining holes 360 symmetrical about an axis of the second through hole 362, and an adjusting hole 364 located in a side of the second adjusting plate 36. The plurality of retaining holes 360 and the adjusting hole 364 are threaded. A fastener 70, such as a bolt, extends through the second through holes 362 and the first through hole 342, and is fixed in the mounting hole 322 so that the second adjusting plate 36, the first adjusting plate 34, and the fixing plate 32 are assembled. One fastener 60 is fixed in the adjusting hole 364 to adjust a second rotatable angle of the second adjusting plate 34 relative to the first adjusting plate 34. Because a distance between every two adjacent threads is minimal, the second rotatable angle of the second adjusting plate 34 relative to the first adjusting plate 34 is correspondingly small. In other words, the second adjusting plate 36 precisely adjusts the rotatable angle of the inspecting member 50 relative to the base 10.

In the illustrated embodiment, the first adjusting plate 34 and the second adjusting plate 36 are defined as an adjusting plate. Alternatively, the first adjusting plate 34 and the second adjusting plate 36 can be integrally formed.

Each of the fixing blocks 42 is installed on the second adjusting plate 36, and includes a pair of third through holes 420 corresponding to two of the plurality of retaining holes 360 of the second adjusting plate 36.

The adjusting block 44 includes a plurality of fourth through holes 440 arranged in two columns, and a pair of grooves 442. A plurality of fasteners 80, such as bolts, extend through the plurality of fourth through holes 440 and the plurality of third through holes 420, and is fixed in the plurality of retaining holes 360 to mount the pair of fixing blocks 42 and the adjusting block 44 on the second adjusting plate 36. A pair of fasteners 60, such as screws, extends through the pair of grooves 442, and is fixed in a pair of threaded holes 52 of the inspecting member 50 to movably mount the inspecting member 50 on the adjusting block 44.

Figure 3:
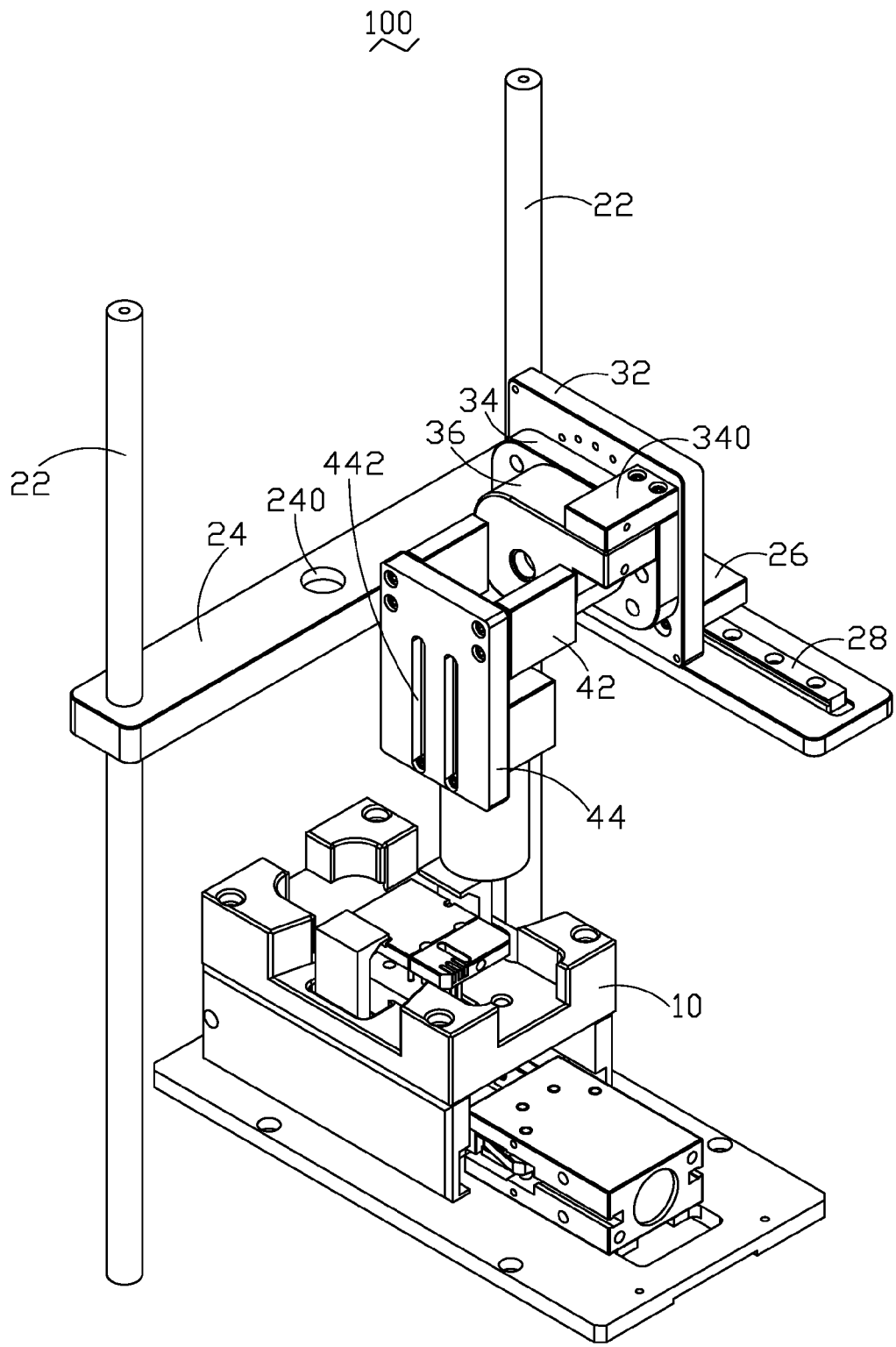
FIG. 3 is an assembled view of FIG. 1.
Figure 4:
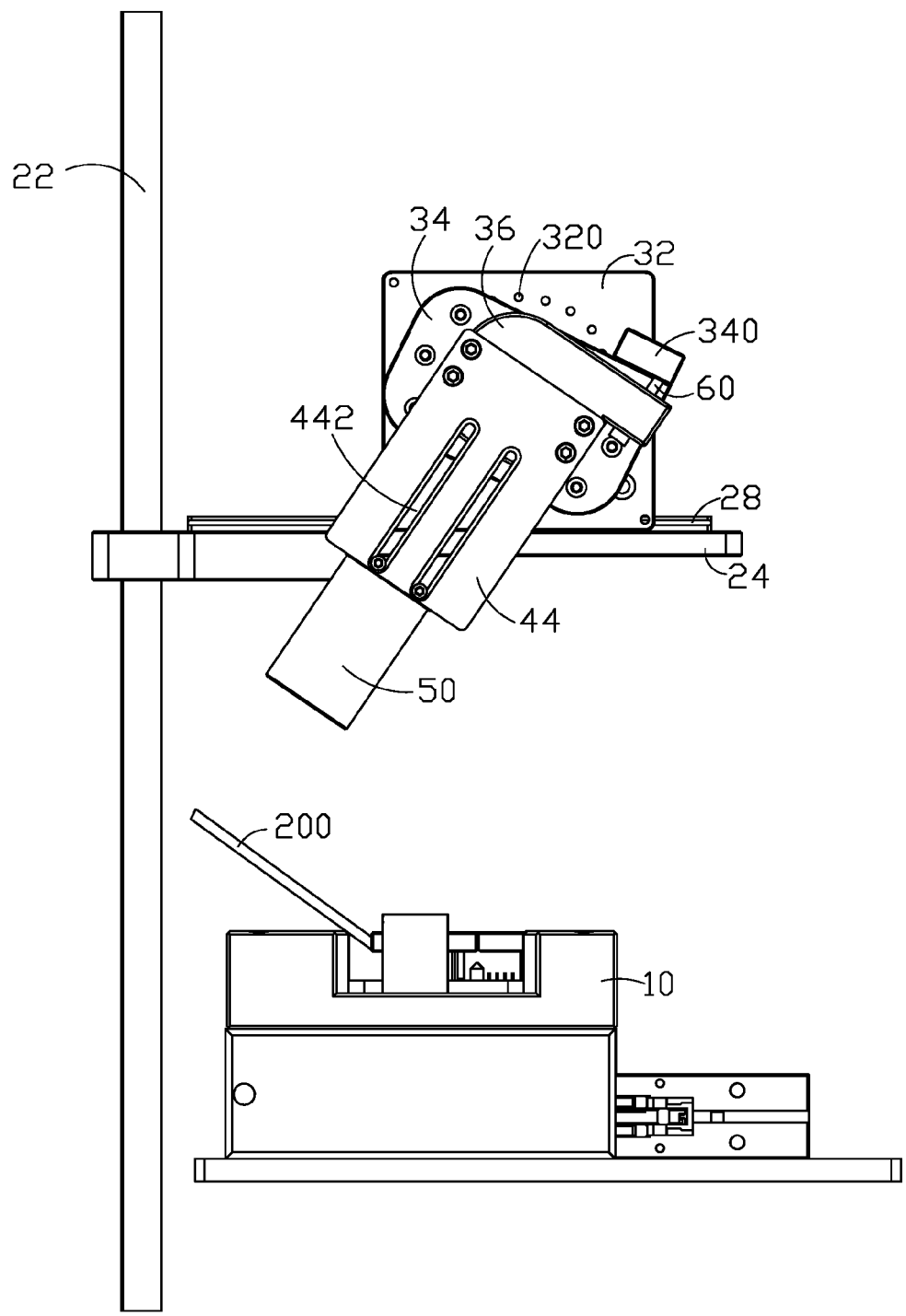
FIG. 4 is similar to FIG. 3, showing an electronic device received in the inspection device.

Referring to FIG. 3-FIG. 4, in assembly, the horizontal plate 24, the sliding block 26, and the guideway 28 of the supporting member 20 are mounted on the locating portion 22 over the base 10. The first adjustment member 30 is fixed on the sliding block 26, and the second adjustment member 40 is fixed on the second adjusting plate 36 of the first adjustment member 30. The inspecting member 50 is slidably mounted on the second adjustment member 40. Thus, the base 10, the supporting member 20, the first adjustment member 30, the second adjustment member 40, and the inspecting member 50 are assembled into the inspection device 100. The electronic device 200 is received in the base 10 of the inspection device 100.

In use, a vertical distance between the inspecting member 50 and the base 10 is adjusted by adjusting a vertical distance between the horizontal plate 24 of the supporting member 20 and the base 10. A horizontal distance between the inspecting member 50 and the base 10 is adjusted by sliding the first adjustment member 30 along the guideway 28. A rotatable angle of the inspecting member 50 relative to the base 10 is adjusted by adjusting the first rotatable angle of the first adjusting plate 34 relative to the fixing plate 32 and the second rotatable angle of the second adjusting plate 34 relative to the first adjusting plate 34. That is, the inspecting member 50 can move vertically and horizontally and rotate relative to the electronic device 200, allowing a wide range of angles from which images can be captured, thus improving the quantity of inspection results.

While an embodiment of the present disclosure has been described, it should be understood that it has been presented by way of example only and not by way of limitation. Thus the breadth and scope of the present disclosure should not be limited by the above-described exemplary embodiments, but should be defined only in accordance with the following claims and their equivalents.

What is claimed is:

1. An inspection device to inspect an electronic device, the inspection device comprising:
    a base to receive the electronic device;
    a supporting member comprising a horizontal plate movable relative to the base, a guideway fixed on the horizontal plate, and a sliding block movably mounted on the guideway;
    a first adjustment member movable relative to the base, the first adjustment member comprising a fixing plate fixed on the sliding block, and an adjusting plate rotatably attached to the fixing plate, and movable and rotatable relative to the base;
    a second adjustment member fixed on the adjusting plate, wherein movement and rotation of the adjusting plate relative to the base allow movement and rotation of the second adjustment member relative to the base; and
    an inspecting member installed on the second adjustment member;
    wherein the movement and the rotation of the second adjustment member relative to the base allow movement and rotation of the inspecting member relative to the electronic device.

2. The inspection device as recited in claim 1, wherein the adjusting plate comprises a first adjusting plate rotatably attached to the fixing plate and a second adjusting plate rotatably attached to the first adjusting plate, wherein the second adjustment member is fixed on the second adjusting plate.

3. The inspection device as recited in claim 2, wherein the second adjustment member comprises a pair of fixing blocks and an adjusting block, wherein the pair of fixing blocks and the adjusting block are fixed on the second adjusting plate.

4. The inspection device as recited in claim 3, wherein the adjusting block defines at least one groove, wherein the inspecting member is installed on the adjusting block via the at least one groove.

5. The inspection device as recited in claim 2, wherein the second adjusting plate comprises an adjusting hole to adjust a rotatable angle of the second adjusting plate relative to the first adjusting plate.

6. The inspection device as recited in claim 2, wherein the fixing plate defines a plurality of locating holes to adjust a rotatable angle of the first adjusting plate relative to the fixing plate.

7. An inspection device to inspect an electronic device, the inspection device comprising:
    an inspecting member;
    a base to receive the electronic device;
    a supporting member to adjust vertical and horizontal distance between the inspecting member and the base, the supporting member comprising a horizontal plate movable relative to the base, a guideway fixed on the horizontal plate, and a sliding block movably mounted on the guideway;
    a first adjustment member movable relative to the base, the first adjustment member comprising a fixing plate fixed on the sliding block, and an adjusting plate rotatably attached to the fixing plate to adjust a rotatable angle of the inspecting member relative to the base; and
    a second adjustment member fixed on the adjusting plate, wherein the inspecting member is movably mounted on the second adjustment member.

8. The inspection device as recited in claim 7, wherein the adjusting plate comprises a first adjusting plate rotatably attached to the fixing plate to roughly adjust the rotatable angle of the inspecting member relative to the base, and a second adjusting plate rotatably attached to the first adjusting plate to precisely adjust the rotatable angle of the inspecting member relative to the base.

9. The inspection device as recited in claim 8, wherein the second adjustment member is fixed on the second adjusting plate.

10. The inspection device as recited in claim 8, wherein the second adjustment member comprises a pair of fixing blocks and an adjusting block, wherein the pair of fixing blocks and the adjusting block are fixed on the second adjusting plate.

11. The inspection device as recited in claim 10, wherein the adjusting block defines at least one groove, wherein the inspecting member is installed on the adjusting block via the at least one groove.

12. The inspection device as recited in claim 8, wherein the second adjusting plate comprises an adjusting hole to adjust a rotatable angle of the second adjusting plate relative to the first adjusting plate.

13. The inspection device as recited in claim 8, wherein the fixing plate defines a plurality of locating holes to adjust a rotatable angle of the first adjusting plate relative to the fixing plate.

* * * * *